United States Patent [19]
Horwinski

[11] 3,904,883
[45] Sept. 9, 1975

[54] LOW OR ZERO POLLUTION HYBRID ENERGY CONVERTER AND TRANSMISSION UNIT

[75] Inventor: Elwood R. Horwinski, Cheshire, Conn.

[73] Assignee: Products, Inc., Cheshire, Conn.

[22] Filed: June 22, 1973

[21] Appl. No.: 372,857

[52] U.S. Cl. .................... 290/50; 290/49; 310/261
[51] Int. Cl.² ........................................ H02K 23/60
[58] Field of Search ............ 290/4.5, 4, 12, 15, 20, 290/23, 29, 39, 49, 30, 50; 318/539, 231, 197; 310/127, 261, 233

[56] References Cited
UNITED STATES PATENTS

| | | | |
|---|---|---|---|
| 2,513,399 | 7/1950 | Brown et al. | 318/539 |
| 2,941,137 | 6/1960 | Fehr | 318/539 |
| 3,025,420 | 3/1962 | McCourt | 318/197 |

*Primary Examiner*—G. R. Simmons
*Attorney, Agent, or Firm*—H. Gibner Lehmann; K. Gibner Lehmann

[57] ABSTRACT

A unit for supplying power with the least possible local pollution to the environment, said unit comprising both a prime mover with fuel supply and also significantly large storage means for electric energy. The unit involves basically a dynamo-electric machine with a commutator-type armature and salient-field type rotator surrounding and rotatably carrying the armature. The rotator is turnable and has sets of slip rings at its ends, for effecting electrical connections to the salient fields and also to brush holders which carry brushes bearing on the commutator. One opposite set of field pole windings is series connected and utilized as a series motor field winding, being connected with one set of brushes whereby the machine can operate as a series motor. Another set of field pole windings is adapted to function as a shunt generator field, the generator function involving a second set of brushes. All the said brushes bear on the same commutator. The armature shaft is coupled to drive a load which could for example be vehicle wheels or else a load of a stationary installation; and the rotary field structure or rotator is coupled to be driven by the prime mover which could be a gasoline engine, steam engine etc. Storage batteries are connected to drive the dynamo-electric machine as a series motor (as for propelling a vehicle) and can be recharged by the shunt generator portion of the dynamo-electric machine when the armature of the latter is being driven by the prime mover or gasoline engine. Suitable automatic electronic controls can be provided to determine the various modes of functioning of the prime mover and dynamo-electric machine.

9 Claims, 4 Drawing Figures

3,904,883

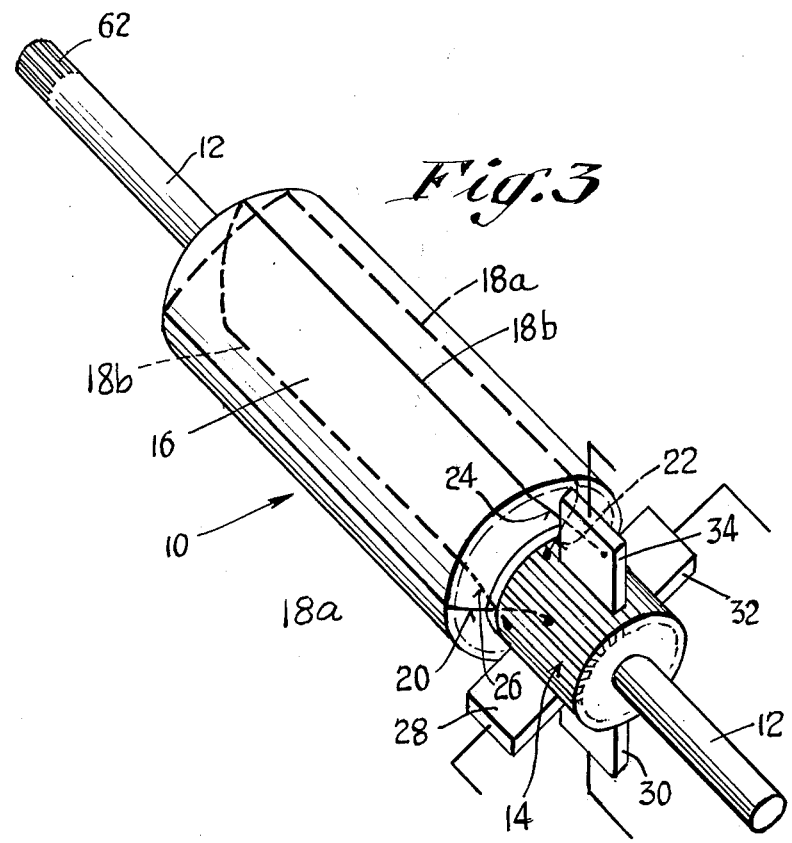
Fig. 3
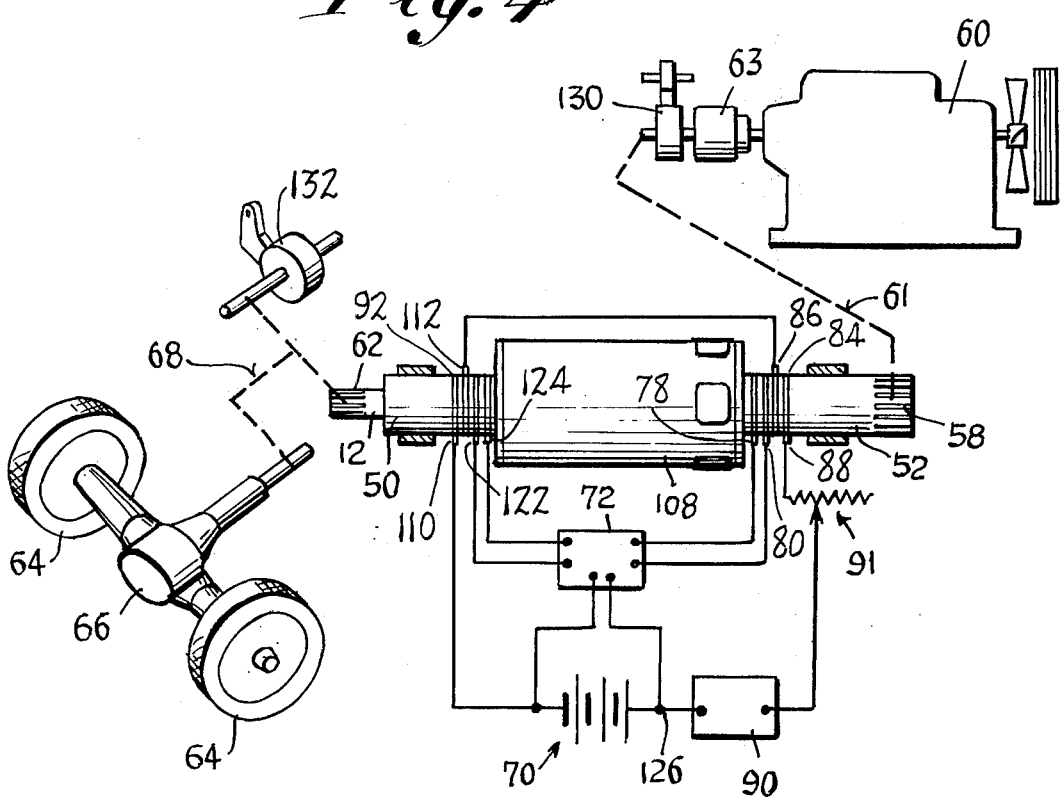

LOW OR ZERO POLLUTION HYBRID ENERGY CONVERTER AND TRANSMISSION UNIT

BACKGROUND

This invention relates to hybrid energy of power systems of the type involving a prime mover such as a gasoline engine, diesel engine, steam engine, etc. co-operating with a large size conbination electric motor-generator in conjunction with chargeable batteries adapted for energizing the motor and for recharge by the generator.

The invention will be illustrated and described with particular reference to vehicles such as automobiles, although it should be understood that it has utility in other applications, wherever power is required with a minimum of localized pollution (such as air pollution).

In the past various types of electric vehicles have been proposed and produced, involving storage batteries which drive electric motors coupled to the vehicle wheels. Also, proposals have been made for auxiliary gasoline engines and generators carried by the electric vehicles, for effecting a charging of the batteries when this becomes necessary or desirable, as in the case where the useful range of the vehicle has to be extended. Such latter vehicles of the hybrid type have received increasing attention recently due to the great importance being attached to reduction of pollution of the environment, particularly the atmosphere. However, they have had the drawback that the necessary power equipment was particularly large, bulky and cumbersome, requiring excessive space. The electric drive motor had to be of considerable size, and this was also true of the generator powered by the gasoline engine. In some instances the gasoline engine could be utilized to drive the vehicle as an emergency or standby expedient, but this did not solve the problem of excessive weight and size of the motive means required, which detracted from the usefulness of the vehicle while increasing cost considerably.

With the present day emphasis on ecology and air polution continuing unabated, increased efforts were made to operate motor vehicles electrically but there has always remained the restriction that only a limited range of travel was possible before loss of power occurred, necessitating charging of the batteries.

SUMMARY

The disadvantages and drawbacks of prior energy units, and especially hybrid electric vehicles, are obviated by the present invention which has for its main object the provision of a novel and improved method of providing and converting energy, and an improved hybrid energy converter and transmission unit wherein less heavy motive or power equipment is required, such equipment also occupying a small space and yet enabling the vehicle to have virtually an unlimited range of travel which is dependent only on the availability of gasoline or other fuel. Related objects of the invention are to provide an improved energy conversion unit which will make possible the use of either elecrical or mechanical energy, individually or jointly in varying proportions, to power or be powered by, in a reversible configuration any load such as a vehicle (moving load), pumping installation (stationary load) with or without reservoir, etc.; and to provide an improved vehicle power unit comprising a unitary dynamo-electric machine so constituted as to function both as an electric drive motor for the vehicle and also as a generator to recharge the electric batteries of the vehicle, and additionally as a electric dynamic transmission.

Still other objects and advantages of the invention reside in the provision of an improved vehicle power unit system whereby maximum utilization is had of the power potential of both the batteries and a gasoline engine while at the same time reducing to a minimum the air polution occasioned by the operation of the gas engine.

The above objects are accomplished by unique equipment characterized by a unitary electric motor-generator constituted as a single machine or unit in which both the armature and field structures are rotatable, and both function not only in a motor sense but also in a generator sense. The field structure is mechanically coupled to be optionally held stationary or else driven by the prime mover, whereas the armature is mechanically coupled to power the load whether this be a vehicle or a stationary load. Batteries power the unitary electric machine for operation as a motor, and the machine functions as a generator when driven by the prime mover, supplying recharging current to the batteries. The optional use of battery power alone, or operation of the prime mover and/or generator provide a great capability to limit local pollution of the environment, or eliminate the same entirely.

Still other features and advantages will hereinafter appear.

In the drawings illustrating one embodiment of the invention.

FIG. 3 is a perspective view of the armature portion of the dynamo-electric machine.

FIG. 4 is a schematic or diagramatic representation of the energy and transmission system of the invention, embodying the novel dynamo-electric machine as well as a prime mover in the form of a gasoline engine, and also a bank of storage batteries. Shown diagrammatically also are controls, a vehicle load, and braking devices.

Figure 1:
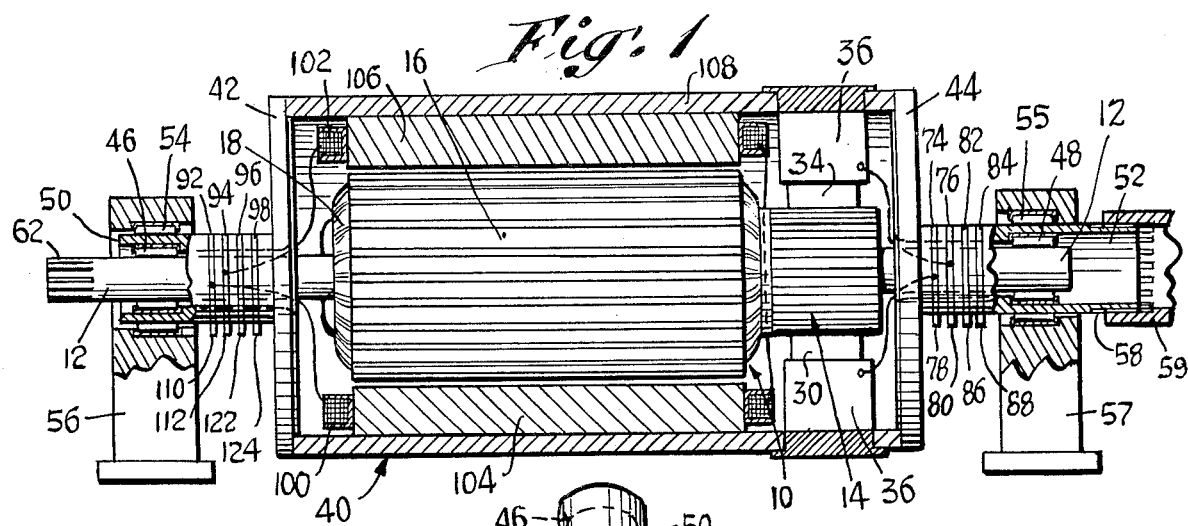
FIG. 1 is an axial sectional view of a combination dynamo-electric machine having rotary armature and field structures, said machine being constituted as a single unit comprising a common armature functioning both in a motor sense and a generator sense.

Considering first FIGs. 1 and 2, the dynamo-electric machine of the present invention, hereinafter also termed a "hybrid converter," as illustrated herein comprises a d.c. type armature 10 including a shaft 12 which there is carried a commutator 14 of multiple segments. The armature 10 has the usual slotted, laminated iron 16 in the slots of which there are wound armature coils 18.

In FIG. 3 the armature 10 is depicted as having smooth-surfaced iron; however, it will be understood that the armature laminations have the usual coil slots to accommodate the winding 18.

Diagrammatically depicted in FIG. 3 are two armature coils 18a and 18b, shown in planes at right angles to each other. The coil 18a can have multiple turns, with the ends 20, 22 connected to a pair of diametrically opposite segments of the commutator 14. Likewise, the armature coil or winding 18b can have multiple turns and can have its ends 24, 26 connected to another pair of diametrically opposite segments of the commutator 14 disposed in magnetic quadrature with the first pair of commutator segments. The windings 18a, 18b, as will be understood, are disposed in the slots of the armature iron 16.

Figure 2:
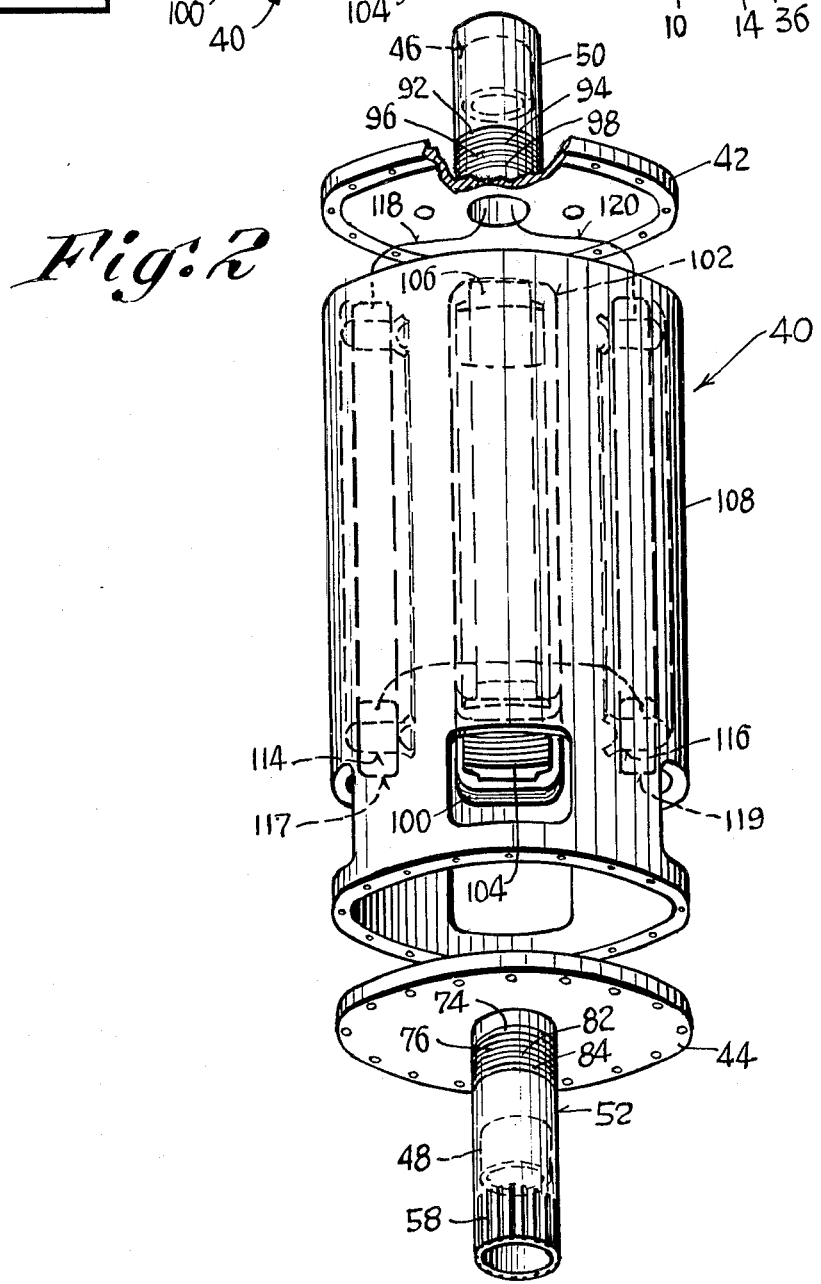
FIG. 2 is an exploded perspective view of essential field or rotator portions of the dynamo-electric machine.

In the illustrated embodiments of the invention four brushes 28, 30, 32, and 34 are arranged in right angled relation and so as to bear on the commutator 14, being carried in usual holders 36 as seen in FIG. 1.

As will be later brought out, two of the brushes on the commutator 14, for example the brushes 28, 32 will be used for motor purposes whereas the remaining two brushes 30, 34 will be used for generator purposes. The FIG. 3 designation is intended to represent one type of conventional armature winding wherein potential applied to any two opposite brushes results in two opposite magnet poles in the armature iron, aligned with the brushes that have potential applied to them. The windings 18a and 18b can be interconnected, by means of other similar windings (not shown).

The dynamo-electric machine or converter further comprises a field structure having salient poles, which is herein termed a rotator for the reason that it is not stationary but instead mounted for rotation about the axis of the armature 10. The rotator is designated generally by the numeral 40, and comprises end bells 42, 44 in which are carried bearings 46, 48 supporting the armature shaft 12 whereby the armature 10 is rotatably mounted in the rotator 40.

Further, the end bells 42, 44 comprise hubs 50, 52 respectively in which the bearings 46, 48 are mounted, said hubs in turn carrying exterior bearings 54, 55 which are supported in bearing stanchions 56, 57 respectively. By such arrangement not only can the armature 10 rotate independently, but the rotator itself can rotate independently, and also independently of the armature.

The hub 52 of the end bell 44 has splines 58 adapted for cooperation with a drive shaft 59 which is coupled to a prime mover such as a gasoline engine 60 by which the rotator 40 can be driven when the engine 60 is operating. The drive mechanism between the engine 60 and rotator 40 is designated generally by the broken line 61 in FIG. 4 and can include gear boxes, clutches with mechanical (manual and automatic) transmissions 63 and the like. The prime mover 60 could also be a steam engine, a diesel or other internal combustion engine or a turbine. It could also be an electric motor powered from a line initially energized from a prime mover type unit.

The armature shaft 12 also has a splined end portion 62 adapted to be coupled to the rear wheels 64 of a vehicle through a suitable differential mechanism 66 as seen in FIG. 4. The coupling of the shaft 12 to the rear wheels 64 is designated diagramatically by the broken line 68 in FIG. 4. Accordingly, it will be seen that torque imparted to the armature 10 can be utilized to supply driving power to the vehicle wheels 64. The drive 68 can include a suitable gear box or mechanical (manual or automatic) transmission. The wheels 64 could be those of an auto, a cart, truck or railroad train. Or, the load represented by the wheels 64 could be the propeller of a boat or other craft, or a stationary pump installation, or an electric power generator of standby or auxiliary equipment.

As already mentioned above, the dynamo-electric unit or converter in FIG. 1 is arranged to function not only as a series electric drive motor but also as a d.c. shunt generator or comparable a.c. designed unit. The power for the series motor is obtained from batteries 70, and the charging current supplied to the batteries 70 is obtained from the generator portion of the dynamo-electric machine or converter. In connection with this latter the generator brushes 30, 34 are connected through a suitable control 72, and through suitable slip rings carried on the hub 52 to the batteries 70.

As shown, the holders 36 for the generator brushes 30, 34 are connected by suitable leads respectively to slip rings 74, 76 on the hub 52, such rings being engaged by brushes 78, 80 respectively. As seen in FIG. 4, the brushes 78, 80 are connected with the control device 72. For accomplishing charging of the battery, the control 72 can connect the shunt generator field coils 117, 119 (through slip rings 96, 98) across the battery 70 directly, or through a current controller (not shown), and can connect the brushes 30, 24 (through slip rings 74, 76) across the battery in a similar manner.

The batteries 70 can comprise cells connected in series, parallel, or series-parallel. Various different connections could be utilized to best suit different phases or modes of operation of the system of the invention.

The motor brushes 28, 32 are connected by suitable leads respectively to slip rings 82, 84 carried by the hub 52, current being taken off by brushes 86, 88 respectively. As seen in FIG. 4 the brush 88 is connected to a motor controller 90 through a variable resistor or control 91.

On the hub 50 four slip rings 92, 94, 96 and 98 are provided, the rings 92, 94 being connected respectively to the series-motor field coils 100, 102 disposed around field poles 104, 106 respectively, which in the illustrated embodiment are located diametrically opposite each other. The field poles 104, 106 have their magnetic curcuit completed through a magnetic casing 108 of cylindrical configuration, constituting the outer case of the rotator 40 to which the end bells 42, 44 are secured.

Brushes 110, 112 respectively engaging the slip rings 92, 94 are connected respectively to the batteries 70 and to that motor brush 86 which is engaged with the slip ring 82 (see FIG. 4). The motor connections above described set forth a series motor, wherein the armature coils and motor field coils are connected in series. In the appended claims such connections are described as "means including slip rings of said sets, connecting the series motor field winding with one commutator brush to provide a series motor circuit." Such means is seen to include the slip rings 94 and 82, which are connected through the brushes 112 and 86 by a wire as clearly illustrated in FIG. 4. The means also include the wire shown in FIG. 3 which extends from the motor brush 28, such wire or lead being connected to the slip ring 82 as specified above. The one commutator brush specified in the connecting means is the brush 28 shown in FIG. 3.

The rotator 40 has a second pair of salient field poles 114, 116 constituting the generator field and disposed, in the illustrated embodiment of the invention, diametrically opposite each other and in a plane at right angles to the plane of the poles 104, 106. The poles 114, 116 have shunt-generator field windings 117, 119 connected internally in series with each other and to leads 118, 120 which are brought out for connection to the generator slip rings 96, 98. Brushes 122, 124 are connected by suitable lead wires with the generator controller 72, as seen in FIG. 4.

The controller 72 is connected to the terminals of the batteries 70, and the motor controller 90 is connected to that battery terminal 126 which is not joined to the slip ring brush 110.

Suitable brake devices 130 and 132 are associated respectively with the rotator, and with the armature 10 and transmission 68 from the motor shaft 12, by which braking forces can be applied under the control of suitable electronic sensing equipment (not shown). It will be understood, however, that braking can be applied to the armature 10 and/or to the rotator 40 of the converter by means of the brakes 132, 130 respectively.

Presuming that the brake 130 is operative and that the brake 132 is released, energy from the batteries 70 can be applied to the dynamo-electric machine or converter to operate the same as a series electic motor whereby the driving force will be applied to the wheels 64 of the vehicle to propel the latter. If at any time the battery voltage falls below a predetermined level, electronic sensing equipment (not shown) will become effective to start the gasoline engine 60 and release the brake 130. In consequence, the engine 60 will provide driving force to the rotator 40 in such a manner that the dynamo-electric machine will also function as a d.c. generator and will provide, through the controller 72, a charging current to the batteries 70. Upon the batteries becoming sufficiently recharged the electronic sensing equipment will automatically shut off the engine 60 and again apply the brake 130 whereby the dynamo-electric machine will operate purely as a series motor.

Below are summarized the various possible modes, phases or methods of operation of the equipment of the invention.

PHASE I, GENERATOR ACTION ALONE, SOLELY TO CHARGE BATTERIES:

Brake 132 is made operative to lock wheels 64 and also armature 10. Brake 130 is released and engine 60 started, thereby driving the rotator 40. The shunt generator field coils 117, 119 can be energized from the batteries 70 through the controller 72 (which can include solid state circuitry) so as to provide the desired field excitation. Or, the residual field magnetism can be utilized, if the machine is to function as a self-excited generator. The armature brushes 30, 34 will pick up the armature current and, through the slip rings 74, 76 and brushes 78, 80 charge the batteries via the circuitry of the controller 72. Connection of the charging emf to the battery would be conditioned upon the battery voltage dropping to a minimum level.

PHASE II, ELECTRIC MOTOR ACTION ALONE, TO PROPEL CAR:

Brake 130 is made operative, to lock rotator 40 against turning. Controller 90 feeds current, small at beginning, to slip rings 84 and 92 to operate armature 10 as in series motor. Brake 132 being already released, enables armature torque to propel vehicle.

PHASE III, HYBRID-ALL AVAILABLE POWER UTILIZED:

With car operating as in Phase III, the engine 60 is started, as by depressing an accelerator pedal, and transmission 63 made operative simulataneously with release of the brake 130. The engine 60 will now drive the rotator 40 in a manner to increase the armature torque and power to the wheels 64.

PHASE IV, SIMULTANEOUS MOTOR AND GENERATOR:

Proceeding as in Phase III, excitation of the shunt field coils 117, 119 is effected through controller 72. Part of the armature 10 continues to act as a motor and another part functions as a generator to charge the batteries 70 during intervals that the load of the wheels 64 lightens to the extent that the engine output exceeds the motor action required. Surplus energy is fed back from the engine, by means of the generator function, to the batteries.

PHASE V, ENGINE ALONE DRIVES VEHICLE:

Assume batteries are discharged or inoperative except to supply only small current to the shunt field coils 117, 119. By electrically loading the armature, using resistors across the pairs of brushes 28, 32 and 30, 34 the converter can function as a dynamic transmission. Or, with the batteries fully inoperative or disconnected, the converter can operate as a self-excited generator so as to serve as a dynamic transmission, in which case the residual magnetism of the field initiates the flux build-up. With the engine 60 driving the rotator 40, the driving force will be applied via the armature 10 to the wheels 64. The brakes 130 and 132 are, of course, released. Control of the amount of resistance across the brushes gives speed control of the vehicle.

ADVANTAGE OF HYBRID OPERATION:

Proportional with the degree of electrical operation of the vehicle as an electric vehicle, two benefits derive. 1. The amount of fuel consumed by the engine can be reduced, saving a product in short supply. 2. Electrical operation does not produce any pollution and thus serves to lessen a present health hazard. In the hybrid vehicle the range of travel of the electric car concept is broadened. An alternative source of power eliminates the ever present problem of prior electric vehicles of being stranded on the road with dead batteries. As long as there is fuel in the hybrid vehicle tank, the operator has transportation.

Overnight charging of batteries from available power outlets will provide the operator of the hybrid vehicle with low cost energy far below today's cost of gasoline or diesel fuel. In town, driving can generally be accomplished with the overnight charge and the engine 60 may not start all day.

The method of the invention embraces, in the illustrated embodiment, the applying of stored electrical or battery energy to d.c. field and armature structures to motivate them as a motor so as to produce torque, and applying another torque to the field structure while electrically energizing the latter so as to obtain from the armature structure a charging current for the batteries. The method also embraces the steps outlined in operational Phases I-V set forth above.

It will be understood from the foregoing that a vehicle provded with the above power means can be operated as an electric vehicle for appreciable distances. When the batteries become somewhat discharged the gasoline engine 60 will be operative automatically to recharge the batteries while the vehicle continues its progress. Upon sufficient charge being provided, the gasoline engine 60 will again be inactivated. A vehicle as thus powered has no limit as to its range, except as access may not be had to gasoline or equivalent fuel. Further, the gasoline engine 60 need not be any specific size, although preferably it is sufficiently large to power the vehicle by itself. During downhill travel the dynamo-electric machine can utilize the available torque to effect changing of the batteries 70 without using the engine. Both generator and electric motor functions are combined as a single unit involving a common armature, thereby resulting in a considerable saving of weight, space and cost. Electric braking is also possible, with the unit shown, usually termed "dynamic braking." By reversing connections to the slip rings 82, 84 the motor direction is reversed, thereby effecting a reversal of the vehicle while at the same time the charging or generator action remains fully operative.

While I have described herein one specific embodiment of the invention it will be understood that other embodiments and modifications are possible without departing from the concept of the invention. For example, the rotator 40 could be connected to the load or wheels 64, and the armature 10 connected to the prime mover or engine 60. A greater number of brushes can be provided on the commutator 14, and additional salient poles can be provided in the rotator 40. Various types of automatic and semi-automatic electronic controllers can be utilized as will be apparent by those skilled in the art.

I claim:

1. A power-converting hybrid unit comprising, in combination:
   a. a rotary electric armature structure having core iron, and having commutator segments connected to coils so as to produce opposite poles at circumferentially spaced locations on the armature-structure iron when a pair of spaced-apart commutator segments is electrically energized,
   b. a plurality of pairs of commutator brushes engaging the commutator segments,
   c. field structure in which the armature structure rotates, said field structure having pairs of opposite poles respectively with a shunt generator field winding and a series motor field winding thereon,
   d. means mounting the field structure for rotation independently of the armature structure and about the axis thereof,
   e. sets of slip rings carried by the field structure, said commutator brushes and said field windings being connected respectively to individual rings of said sets,
   f. slip-ring brushes engaged with said slip rings, and
   g. means including slip rings of said sets, connecting the series motor field winding with one commutator brush to provide a series motor circuit.

2. A power converting hybrid unit as in claim 1, and further including:
   a. a battery,
   b. a variable electric controller, and
   c. means connecting the battery and controller to one pair of said slip rings so as to supply a variable electric power thereto for the purpose of energizing the armature structure.

3. A power converting hybrid unit as in claim 1, and further including:
   a. an engine of the prime mover type,
   b. drive means connecting said field structure to the engine to be driven thereby,
   c. a rotative mechanical load, and
   c. means connecting said load to the armature structure to be driven thereby.

4. A power converting hybrid unit as in claim 1, and further including:
   a. brake means connected with said field structure, and
   b. brake means connected with said armature structure.

5. A power converting hybrid unit as in claim 1, and further including:
   a. a battery,
   b. a variable electric controller, and
   c. means connecting the battery and controller to one pair of said slip rings so as to supply a variable electric power thereto for the purpose of energizing the armature structure,
   d. an electric charging control device, and
   e. means connecting another pair of said slip rings through said charging control device to said battery to enable the latter to be charged from said other pair of slip rings.

6. A power converting hybrid unit as in claim 5, and further including:
   a. means for energizing the field windings from the battery.

7. A power converting hybrid unit as in claim 6, and further including:
   a. an automatic transmission including a clutch, in the drive means which connects said one structure to the engine.

8. A power converting hybrid unit as in claim 1, wherein:
   a. the field structure has a total of four poles, and
   b. the brushes engaging the commutator comprise two pairs.

9. A power converting hybrid unit as in claim 1, and further including:
   a. an engine of the prime mover type,
   b. a rotative mechanical load,
   c. drive means connecting one of said structures to the engine to be driven thereby, and
   d. means connecting said load to the other of said structures to be driven thereby.

* * * * *